United States Patent
Okura et al.

(10) Patent No.: US 10,030,465 B2
(45) Date of Patent: Jul. 24, 2018

(54) SOLIDIFICATION- AND EXTRUSION-MOLDED ARTICLE OF POLYGLYCOLIC ACID AND METHOD FOR MANUFACTURING SAME

(71) Applicant: Kureha Corporation, Tokyo (JP)

(72) Inventors: Masayuki Okura, Tokyo (JP); Takeo Takahashi, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 476 days.

(21) Appl. No.: 14/433,490

(22) PCT Filed: Nov. 14, 2013

(86) PCT No.: PCT/JP2013/080751
§ 371 (c)(1),
(2) Date: Apr. 3, 2015

(87) PCT Pub. No.: WO2014/077302
PCT Pub. Date: May 22, 2014

(65) Prior Publication Data
US 2015/0252646 A1 Sep. 10, 2015

(30) Foreign Application Priority Data

Nov. 15, 2012 (JP) .................. 2012-251670

(51) Int. Cl.
*E21B 33/12* (2006.01)
*B29C 47/00* (2006.01)
(Continued)

(52) U.S. Cl.
CPC ........ *E21B 33/1208* (2013.01); *B29C 47/003* (2013.01); *B29C 47/0016* (2013.01);
(Continued)

(58) Field of Classification Search
CPC .... E21B 33/1208; E21B 33/00; B29C 47/004
(Continued)

(56) References Cited

U.S. PATENT DOCUMENTS

| 4,073,052 A | 2/1978 | Szonntagh |
| 4,158,540 A | 6/1979 | Stillhard et al. |

(Continued)

FOREIGN PATENT DOCUMENTS

| JP | 2004-230762 A | 8/2004 |
| JP | 2005226031 A | 8/2005 |

(Continued)

OTHER PUBLICATIONS

Japanese Office Action, dated Aug. 22, 2017, for Japanese Application No. 2014-547018, with an English translation.

(Continued)

*Primary Examiner* — Daniel P Stephenson
(74) *Attorney, Agent, or Firm* — Birch, Stewart, Kolasch & Birch, LLP

(57) ABSTRACT

A solidification- and extrusion-molded article of polyglycolic acid, which is formed of a resin material containing polyglycolic acid, the polyglycolic acid having a melt viscosity of 200 to 2,000 Pa·s, and has a thickness or diameter of greater than 100 mm but not greater than 500 mm. A downhole tool or a component thereof and a ball sealer for petroleum excavation are formed by cutting the solidification- and extrusion-molded article. A method for manufacturing the solidification- and extrusion-molded article of polyglycolic acid and a method for manufacturing a ball sealer for petroleum excavation.

9 Claims, 2 Drawing Sheets

Figure 1:
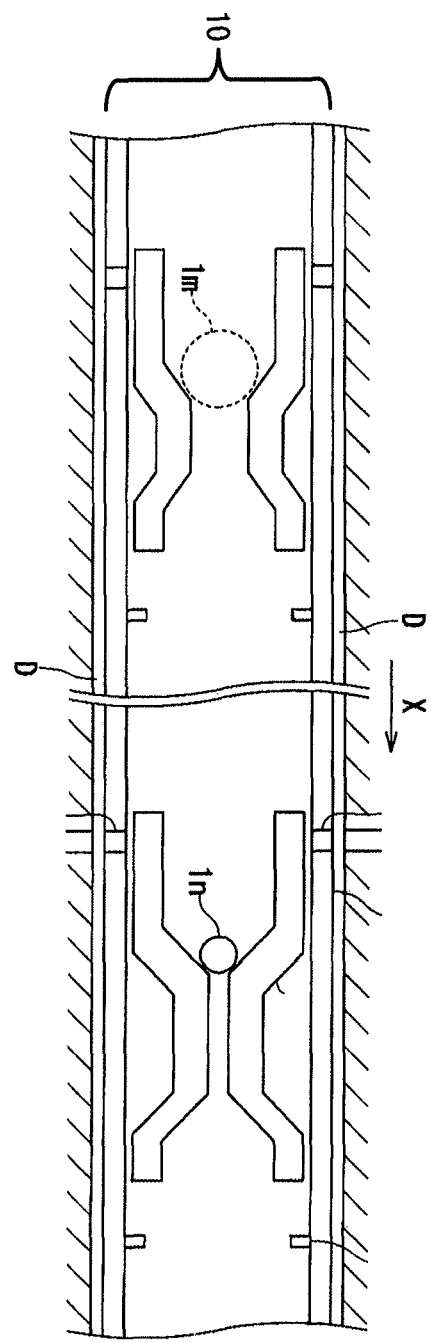
Figure 2:
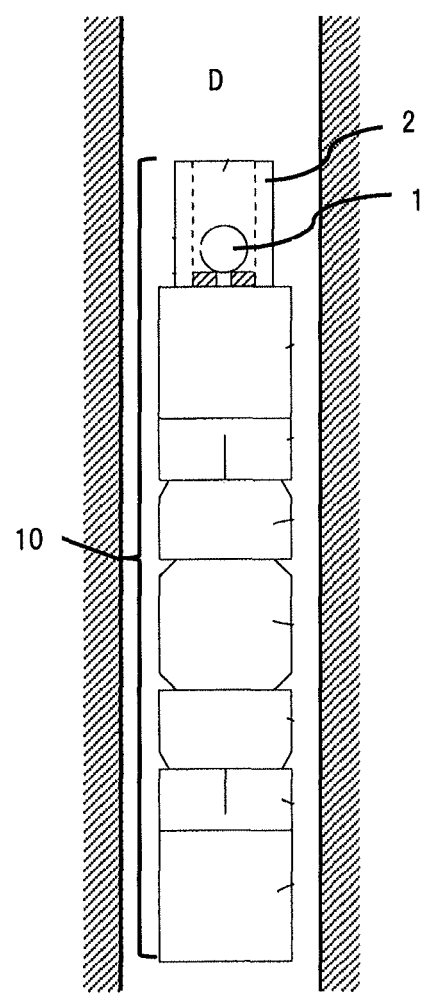

(51) Int. Cl.
    B29C 47/90     (2006.01)
    B29C 47/88     (2006.01)
    B29C 47/92     (2006.01)
    E21B 33/138    (2006.01)
    B29K 33/04     (2006.01)
    B29L 31/00     (2006.01)

(52) U.S. Cl.
    CPC ...... *B29C 47/0021* (2013.01); *B29C 47/0033* (2013.01); *B29C 47/0061* (2013.01); *B29C 47/0066* (2013.01); *B29C 47/8805* (2013.01); *B29C 47/8815* (2013.01); *B29C 47/90* (2013.01); *B29C 47/92* (2013.01); *E21B 33/138* (2013.01); *B29C 47/0004* (2013.01); *B29C 2947/92695* (2013.01); *B29C 2947/92704* (2013.01); *B29K 2033/04* (2013.01); *B29L 2031/003* (2013.01); *Y10T 428/298* (2015.01)

(58) Field of Classification Search
    USPC .......................................... 428/35.7; 264/452
    See application file for complete search history.

(56) References Cited

U.S. PATENT DOCUMENTS

| | | | |
|---|---|---|---|
| 5,908,917 A | 6/1999 | Kawakami et al. | |
| 7,353,879 B2* | 4/2008 | Todd | E21B 23/00 166/317 |
| 7,661,481 B2* | 2/2010 | Todd | E21B 33/12 166/120 |
| 7,775,278 B2* | 8/2010 | Willberg | C09K 8/508 166/280.1 |
| 8,158,240 B2 | 4/2012 | Nishihata et al. | |
| 8,158,242 B2 | 4/2012 | Nishihata et al. | |
| 2004/0231845 A1* | 11/2004 | Cooke, Jr. | C08G 63/06 166/279 |
| 2005/0205266 A1* | 9/2005 | Todd | E21B 23/00 166/376 |
| 2007/0044966 A1* | 3/2007 | Davies | C09K 8/516 166/287 |
| 2011/0147014 A1* | 6/2011 | Chen | E21B 23/04 166/387 |
| 2013/0224485 A1 | 8/2013 | Saigusa et al. | |
| 2013/0240200 A1* | 9/2013 | Frazier | E21B 33/134 166/135 |
| 2013/0240203 A1* | 9/2013 | Frazier | E21B 33/129 166/193 |
| 2015/0252646 A1* | 9/2015 | Okura | B29C 47/0016 166/192 |

FOREIGN PATENT DOCUMENTS

| | | | |
|---|---|---|---|
| JP | 2010069718 A | * | 4/2010 |
| JP | 2010069718 A | | 4/2010 |
| WO | WO/2012/066955 A1 | | 5/2012 |
| WO | WO/2012/121294 A1 | | 9/2012 |

OTHER PUBLICATIONS

International Search Report of PCT/JP2013/080751 dated Feb 18, 2014.

English translation of International Preliminary Report on Patentability dated May 19, 2015, issued in PCT International Application No. PCT/JP2013/080751.

Japanese Notification of Reasons for Rejection for Japanese Application No. 2014-547018, dated Nov. 7, 2017, with English translation.

* cited by examiner

SOLIDIFICATION- AND EXTRUSION-MOLDED ARTICLE OF POLYGLYCOLIC ACID AND METHOD FOR MANUFACTURING SAME

TECHNICAL FIELD

The present invention relates to a solidification- and extrusion-molded article of polyglycolic acid and a method for manufacturing the same. More particularly, the present invention relates to a solidification- and extrusion-molded article of polyglycolic acid that is thick or has a large diameter and that can be formed into a secondarily molded product of a desired shape by machining such as cutting, drilling, and shearing, and a method for manufacturing the same.

BACKGROUND ART

Resin molded articles having a three-dimensional shape or complex shape are molded typically by injection molding. Injection molding can mass-produce molded articles having a desired shape. However, in order to manufacture molded articles that are required to have a high dimensional precision by injection molding, an expensive die having a high dimensional precision is required. Furthermore, since injection-molded articles are readily deformed by shrinkage and/or residual stress after the injection molding, the shape of the die needs to be adjusted precisely depending on the shape of the molded article and properties of the resin material. Since fraction defective is high in injection molding, product cost thereby is often high. Furthermore, injection molding of a molded article having a large thickness is difficult due to shrinkage and/or residual stress.

In order to obtain molded articles having a three-dimensional shape or complex shape, a method for molding a secondarily molded article having a desired shape, the method comprising: extruding and solidifying a resin material; producing a stock shape for machining (also referred to as "stock shape for cutting") having a shape, such as a plate, round bar, pipe, special shape, or another shape; and subjecting the stock shape for machining to machining, such as cutting, drilling, and shearing, has been known. The method of machining the stock shape for machining has advantages, including that a molded articles can be produced in small quantities at a relatively low cost because an expensive die is not required, that frequent modifications in molded article specifications can be accommodated, that molded articles with high dimensional precision can be obtained, that molded articles having a complex shape or large thickness, which is not suitable for production using injection molding, can be produced, and the like.

However, not all resin materials and/or extrusion molded articles are suitable as stock shapes for machining. A stock shape for machining needs to satisfy high levels of required properties, such as having a large thickness and excellent machinability, having low residual stress, being capable of avoiding excessive heat generation that leads to deformation and/or discoloration due to heat of friction generated during machining, being capable of being machined with high precision, and the like.

In general, most of processing methods used in metallic materials are utilized in machining of polymeric stock shapes as is. Even among extrusion molded products, an extrusion molded product that is thin and has great flexibility, such as a typical film, sheet, or tube, is unsuitable for machining such as cutting. Even among extrusion molded products having shapes, such as plate or round bar, with a large thickness or large diameter, if the extrusion molded product has excessively large residual stress during extrusion molding, the extrusion molded product readily deforms during or after machining, and it is difficult to obtain a secondarily molded article having high dimensional precision. Even among extrusion molded products having reduced residual stress, the extrusion molded product that readily breaks or cracks during machining, such as cutting, drilling, and shearing, is not suitable as stock shape for machining.

In order to obtain, via extrusion molding, a stock shape for machining having properties suitable for machining, selection of resin materials, method of extrusion molding, or the like needs to be devised. Therefore, various extrusion molding methods for producing extrusion molded articles suitable as stock shapes for machining, the method using resin materials that contain general-purpose resins and/or engineering plastics, have been proposed so far.

For example, Japanese Unexamined Patent Application Publication No. 2005-226031A (Patent Document 1) discloses a method for producing a stock shape for machining having a thickness or diameter exceeding 3 mm, the method comprising solidification- and extrusion-molding a resin composition containing an engineering plastic such as a polyether ether ketone, polyetherimide, polyphenylene sulfide, polysulfone, polyether sulfone, or polycarbonate.

On the other hand, biodegradable plastics have drawn attention as polymer materials that have little adverse effect on the environment, and have been used in applications including extrusion molded articles such as films and sheets, blow molded articles such as bottles, injection molded articles, and the like. Recently, application of biodegradable plastics in stock shapes for machining has been increasingly demanded.

Polyglycolic acid is a crystalline resin having superior tensile strength, tensile elongation, bending strength, elastic modulus in bending, hardness, flexibility, heat resistance, and the like compared to other biodegradable plastics such as polylactic acid, and the polyglycolic acid is also a biodegradable plastic having greater or equal gas barrier properties to general-purpose gas barrier resins. Polyglycolic acid can be molded into films and/or sheets via extrusion molding. For example, Japanese Patent No. 4073052B (Patent Document 2) discloses a method for molding polyglycolic acid into a sheet via extrusion molding. In the disclosure, various sheet molded articles are produced using the sheet, having a thickness of 0.01 to 5 mm, utilizing its toughness, heat resistance, transparency, and other characteristics.

Furthermore, Japanese Unexamined Patent Application Publication No. 2010-069718B (Patent Document 3) discloses a solidification- and extrusion-molded article of polyglycolic acid, having a thickness or diameter of 5 to 100 mm, that is produced by subjecting polyglycolic acid to solidification- and extrusion-molding. Specifically, a solidification- and extrusion-molded article of polyglycolic acid having a density of 1.575 to 1.625 $g/cm^3$ and a thickness or diameter of 5 mm or greater but 100 mm or less, the solidification- and extrusion-molded article of polyglycolic acid being formed of a resin material containing polyglycolic acid having a melt viscosity of 10 to 1,500 Pa·s, particularly preferably 70 to 900 Pa·s, measured at a temperature of 270° C. under a shearing speed of 120 $sec^{-1}$, has been disclosed. Patent Document 3 describes that, if the thickness or diameter is too large (i.e. the thickness or diameter exceeds 100 mm), it will be difficult to sufficiently remove or reduce residual stress even when the solidification- and extrusion-molded article is heat-treated, and machining a solidification- and extrusion-molded article having a large residual stress tends to cause deformation in the obtained secondarily molded product.

If an extrusion molded article that is thicker and suitable as a stock shape for machining such as cutting can be obtained by using polyglycolic acid, which is a degradable plastic, it will be possible to provide a secondarily molded article having excellent properties, leading to development of new applications of polyglycolic acid.

To retrieve hydrocarbon resources (in the present invention, also simply referred to as "petroleum") from ground containing hydrocarbon resources such as petroleum (e.g. shale oil) and gas (e.g. shale gas), a downhole (underground bore hole) is provided. Use of degradable plastic in downhole tools or components thereof (i.e. downhole tool components; e.g. mandrel of a plug for petroleum excavation or the like is well known), which are components used to form or maintain the downhole or to promote the retrieval of the resources, is expected since degradable plastic can be disintegrated in the downhole without collecting it on the ground after use.

For example, relatively small ball sealers that have a diameter of 16 to 32 mm and that are formed from non-degradable materials such as aluminum and/or non-degradable resins such as nylon and phenol resins which are coated, as necessary, with rubber to improve sealing properties has been conventionally used as ball sealers (which is an example of a downhole tool) used to fill bore holes. However, in recent years, demands for ball sealers or the like having a larger diameter (e.g. diameter of 25 to 100 mm or even greater) have been increasing as a part of components constituting a downhole tool (downhole tool component), such as plugs, including frac plugs and the like, and frac sleeves (tube and plug for hydraulic fracture), used in hydraulic fracturing. When a ball sealer or the like having such a large diameter is produced by injection molding or compression molding using a degradable resin, which is often a crystalline resin, sink marks and/or voids are caused due to thermal shrinkage after the production or shrinkage associated with crystallization, and dimensional precision required for ball sealers, which is a filling component, or the like is not obtained. In order to obtain a ball sealer or the like having a relatively large diameter, production of a ball sealer or the like by cutting a solidification- and extrusion-molded article having a large thickness or diameter formed of degradable resin, for example, has been attempted. However, as described above, when the thickness or diameter of the solidification- and extrusion-molded article of polyglycolic acid, which is a degradable resin, exceeds 100 mm, it is difficult to sufficiently remove or reduce residual stress, the obtained secondarily molded product tends to be deformed, and, in some cases, breaks or cracks readily occur. Therefore, a solidification- and extrusion-molded article of degradable resin having excellent strength, processability, and the like as well as having a sufficiently large thickness or diameter to obtain a ball sealer or the like having a relatively large diameter has been demanded.

CITATION LISTS

Patent Documents

Patent Document 1: Japanese Unexamined Patent Application Publication No. 2005-226031A (corresponding to U.S. patent application Publication No. 2008/0038517 specification)

Patent Document 2: Japanese Patent No. 4073052B (U.S. Pat. No. 5,908,917 specification)

Patent Document 3: Japanese Unexamined Patent Application Publication No. 2010-069718A

SUMMARY OF INVENTION

Technical Problem

An object of the present invention is to provide a solidification- and extrusion-molded article of degradable resin that can be molded into secondarily molded products such as, in particular, a ball sealer for petroleum excavation which is a downhole tool or component thereof, having various desired shapes by machining, such as cutting, drilling, and shearing; and to provide a method for manufacturing the same.

Solution to Problem

As a result of diligent research to solve the above problems, the present inventors have found that a solidification- and extrusion-molded article of degradable resin, specifically a solidification- and extrusion-molded article of polyglycolic acid, having a thickness or diameter exceeding 100 mm can be obtained by optimizing the melt viscosity of polyglycolic acid, conditions for solidification- and extrusion-molding, and the like, and, in particular, by controlling the expansion of the solidified and extruded matter in a thickness direction or radial direction via pressurizing the solidified and extruded matter, and thus completed the present invention.

According to the present invention, a solidification- and extrusion-molded article of polyglycolic acid that is formed of a resin material containing polyglycolic acid, the polyglycolic acid having a melt viscosity of 200 to 2,000 Pa·s upon being measured at a temperature of 270° C. under a shearing speed of 120 sec$^{-1}$; and having a thickness or diameter of greater than 100 mm but not greater than 500 mm is provided.

As embodiments according to the present invention, solidification- and extrusion-molded articles of polyglycolic acid described below (1) to (4) are provided.

(1) The solidification- and extrusion-molded article of polyglycolic acid described above, wherein the solidification- and extrusion-molded article has a round bar or plate shape.

(2) The solidification- and extrusion-molded article of polyglycolic acid described above, wherein the resin material is a polyglycolic acid composition containing from 0.001 to 5 mass % of colorant in terms of a total mass.

(3) The solidification- and extrusion-molded article of polyglycolic acid described above, wherein the resin material is a polyglycolic acid composition containing from 5 to 70 mass % of filler in terms of a total mass.

(4) The solidification- and extrusion-molded article of polyglycolic acid described above, wherein the solidification- and extrusion-molded article is a stock shape for machining.

Furthermore, according to the present invention, a method for manufacturing a solidification- and extrusion-molded article of polyglycolic acid is provided; the method comprising steps 1 to 4 below:

a) step 1 of supplying a resin material containing polyglycolic acid, the polyglycolic acid having a melt viscosity of 200 to 2,000 Pa·s upon being measured at a temperature of 270° C. under a shearing speed of 120 sec$^{-1}$, into an extruder, and melt-kneading the resin material at a cylinder temperature of the extruder of 240 to 285° C.;

b) step 2 of extruding the resin material, melted by melt-kneading, from an extrusion die at a tip of the extruder into a flow path of a forming die comprising cooling means and the flow path that communicates with a path of melted resin of the extrusion die and that has a cross-sectional shape of an extrusion molded article;

c) step 3 of solidifying the melted and extruded matter formed from the resin material by cooling in the flow path of the forming die, and then extruding the solidified and extruded matter from the tip of the forming die to outside; and d) step 4 of pressurizing the solidified and extruded matter, and drawing the same while applying back pressure thereto in a direction of the forming die to suppress expansion of the solidified and extruded matter in a thickness direction or radial direction to obtain a solidification- and extrusion-molded article of polyglycolic acid having a thickness or diameter of greater than 100 mm but not greater than 500 mm.

As embodiments according to the present invention, methods for manufacturing a solidification- and extrusion-molded article of polyglycolic acid described below (i) to (v) are provided.

(i) The manufacturing method described above, wherein, in the step 3, a forming die having heating means in addition to the cooling means is used; and the step 3 comprises: first, heating the melted and extruded matter in the flow path around an extrusion die outlet to a temperature of 230 to 290° C. by the heating means, and then cooling the melted and extruded matter in the flow path to a temperature lower than a crystallization temperature of the polyglycolic acid to solidify the melted and extruded matter by the cooling means.

(ii) The manufacturing method described above, further comprising step 5, in which the solidification- and extrusion-molded article of polyglycolic acid obtained in the step 4 is heat-treated at a temperature of 150 to 230° C. for 3 to 24 hours.

(iii) The manufacturing method described above, wherein the resin material is a polyglycolic acid composition containing from 0.001 to 5 mass % of colorant in terms of a total mass.

(iv) The manufacturing method described above, wherein the resin material is a polyglycolic acid composition containing from 5 to 70 mass % of filler in terms of a total mass.

(v) The manufacturing method described above, wherein, in the step 4, a solidification- and extrusion-molded article of polyglycolic acid having a round bar or plate shape is obtained.

Furthermore, a downhole tool or component thereof, particularly a plug for petroleum excavation or a mandrel of the plug and a ball sealer for petroleum excavation having a diameter of 20 to 200 mm, that is formed by cutting the solidification- and extrusion-molded article of polyglycolic acid described above is provided according to the present invention. A method for manufacturing a downhole tool or component thereof, particularly a ball sealer for petroleum excavation having a diameter of 20 to 200 mm, the method comprising step 6 of cutting the solidification- and extrusion-molded article of polyglycolic acid manufactured by the manufacturing method described above is also provided according to the present invention.

Advantageous Effects of Invention

According to the present invention, since a solidification- and extrusion-molded article of polyglycolic acid is formed of a resin material containing polyglycolic acid, the polyglycolic acid having a melt viscosity of 200 to 2,000 Pa·s when measured at a temperature of 270° C. under a shearing speed of 120 sec$^{-1}$, and has a thickness or diameter of greater than 100 mm but not greater than 500 mm, a solidification- and extrusion-molded article of polyglycolic acid that can be formed into a secondarily molded product such as, in particular, a ball sealer for petroleum excavation, can be provided via machining, such as cutting, drilling, and shearing; and a ball sealer for petroleum excavation or the like can be provided. Furthermore, according to the manufacturing method of the present invention, it is possible to provide a solidification- and extrusion-molded article of polyglycolic acid having properties suitable for machining to form a secondarily molded product, particularly a ball sealer for petroleum excavation or the like, that has reduced residual stress and excellent hardness, strength, and flexibility.

DESCRIPTION OF EMBODIMENTS

1. Solidification- and extrusion-Molded Article of Polyglycolic Acid

The solidification- and extrusion-molded article of polyglycolic acid of the present invention is a solidification- and extrusion-molded article of polyglycolic acid that is formed of a resin material containing polyglycolic acid, the polyglycolic acid having a melt viscosity of 200 to 2,000 Pa·s when measured at a temperature of 270° C. under a shearing speed of 120 sec$^{-1}$; and having a thickness or diameter of greater than 100 mm but not greater than 500 mm.

The polyglycolic acid used in the present invention is a polymer containing a repeating unit represented by formula 1: —(—O—CH$_2$—CO—)—. The proportion of the repeating unit represented by formula 1 in the polymer is typically 50 mass % or greater, preferably 70 mass % or greater, more preferably 80 mass % or greater, even more preferably 90 mass % or greater, particularly preferably 95 mass % or greater, and most preferably 99 mass % or greater. If the proportion of the repeating unit represented by formula 1 is less than 70 mass %, toughness, crystallizability, heat resistance, hardness, gas barrier properties, and the like tend to be decreased. In many cases, use of homopolymer of polyglycolic acid, where the proportion of the repeating unit represented by formula 1 is 100 mass %, is the most preferable.

The polyglycolic acid can be produced by condensation polymerization of glycolic acid or ring-opening polymerization of glycolide. Preferable repeating units other than the repeating unit represented by formula 1 include, for example, repeating units derived from cyclic monomers such as ethylene oxalate, lactide, lactones, trimethylene carbonate, and 1,3-dioxane; however, the repeating unit is not limited to these.

By introducing the cyclic monomer-derived repeating unit at a proportion of 1 mass % or greater, processing temperature can be lowered by lowering the melting point of the polyglycolic acid, and thus thermal decomposition during melt processing can be reduced. Extrusion moldability can be also enhanced by controlling the rate of crystallization of the polyglycolic acid by means of copolymerization. On the other hand, if the amount of the cyclic monomer-derived repeating unit is too large, intrinsic crystallizability of polyglycolic acid will be lost, and the toughness, heat resistance, and the like of the obtained solidification- and extrusion-molded article may be significantly lowered.

The polyglycolic acid used in the present invention is preferably a high-molecular weight polymer. The melt viscosity of the polyglycolic acid used in the present invention measured at a temperature of 270° C. under a shearing speed of 120 sec$^{-1}$ is from 200 to 2,000 Pa·s, preferably from 450 to 1,600 Pa·s, more preferably from 700 to 1,400 Pa·s, particularly preferably from 850 to 1,300 Pa·s, and most preferably from 910 to 1,200 Pa·s.

If the melt viscosity of the polyglycolic acid is too low, melt extrusion and/or solidification- and extrusion-molding will be difficult, the flexibility and toughness of the obtained solidification- and extrusion-molded article will be reduced, and the solidification- and extrusion-molded article will be easily cracked during machining. Furthermore, if the melt viscosity of the polyglycolic acid is too low, the solidification- and extrusion-molded article may be cracked during heat treatment (annealing) of the solidification- and extrusion-molded article. If the melt viscosity of the polyglycolic acid is too high, thermal degradation of the polyglycolic acid will easily occur since the polyglycolic acid has to be heated to a high temperature during melt extrusion.

The resin material used in the present invention is a resin composition containing polyglycolic acid as a main component. The word "main component" represents that the contained proportion of the polyglycolic acid in the resin component is typically 50 mass % or greater, preferably 70 mass % or greater, more preferably 80 mass % or greater, and even more preferably 90 mass % or greater. Examples of other resin components include thermoplastic resins other than polyglycolic acid, such as polylactic acid and other biodegradable resins. Obviously, a resin composition in which the contained proportion of the polyglycolic acid in the resin component is 100 mass % can be used.

The resin material used in the present invention may contain a colorant such as a dye or pigment. By using a colorant, a solidification- and extrusion-molded article of polyglycolic acid that is high quality and that can be easily cut can be obtained. As the colorant, a pigment is preferable from the perspective of having excellent heat resistance. As the pigment, pigments of various color tones, such as yellow pigments, red pigments, white pigments, and black pigments, that are used in the technical field of synthetic resin can be used. Among these pigments, carbon black is particularly preferable. Examples of the carbon black include acetylene black, oil furnace black, thermal black, channel black, and the like.

The resin material used in the present invention is preferably a polyglycolic acid composition containing from 0.001 to 5 mass % of colorant in terms of the total mass. The contained proportion of the colorant is preferably from 0.01 to 3 mass %, and more preferably from 0.05 to 2 mass %. Although the colorant can be melt-kneaded with the polyglycolic acid, optionally, it is also possible to prepare a resin material having a desired colorant concentration by producing a polyglycolic acid composition having a high colorant concentration (masterbatch) and then diluting the masterbatch with polyglycolic acid. From the perspective of uniform dispersibility of the colorant, it is preferable to prepare a resin material that is formed into a pellet by melt-kneading the polyglycolic acid and the colorant.

The resin material used in the present invention can contain filler in order to enhance mechanical strength and heat resistance. As the filler, fibrous fillers and granular or powdered fillers can be used; however, fibrous fillers are preferable.

Examples of fibrous filler include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as polyamides, fluorine resins, polyester resins, and acrylic resins; and the like. Short fibers having a length of 10 mm or less, more preferably 1 to 6 mm, and even more preferably 1.5 to 4 mm are preferable as the fibrous fillers. Furthermore, inorganic fibrous substances are preferably used, and glass fibers are particularly preferable.

As the granular or powdered filler, mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, barium sulfate, and the like can be used.

These fillers can be used alone, or two or more types thereof can be combined for use. The filler may be treated with a sizing agent or surface treatment agent as necessary. Examples of the sizing agent or surface treatment agent include functional compounds such as epoxy-based compounds, isocyanate-based compounds, silane-based compounds, and titanate-based compounds. These compounds may be used to perform surface treatment or sizing treatment on the filler in advance or may be added at the same time as the preparation of the resin composition.

The resin material used in the present invention is preferably a polyglycolic acid composition containing from 5 to 70 mass % of filler in terms of the total mass. The contained proportion of the filler is preferably from 10 to 60 mass %, more preferably from 15 to 50 mass %, and even more preferably from 20 to 40 mass %. Although the filler can be melt-kneaded with the polyglycolic acid, optionally, it is also possible to prepare a resin material having a desired filler concentration by producing a polyglycolic acid composition having a high filler concentration (masterbatch) and then diluting the masterbatch with polyglycolic acid. From the perspective of uniform dispersibility of the filler, it is preferable to prepare a resin material that is formed into a pellet by melt-kneading the polyglycolic acid and the filler.

In the resin material used in the present invention, as other additives other than those described above, for example, impact modifiers, resin-modifying agents, corrosion inhibitors for die such as zinc carbonate and nickel carbonate, lubricants, thermosetting resins, antioxidants, ultraviolet absorbents, nucleating agents such as boron nitride, flame retardants, and the like can be suitably added.

The density ("density" refers to the density of resin part excluding the filler part) of the solidification- and extrusion-molded article of polyglycolic acid of the present invention is not particularly limited as long as the solidification- and extrusion-molded article of polyglycolic acid is a solidification- and extrusion-molded article of polyglycolic acid that is formed of a resin material containing the polyglycolic acid and has a thickness or diameter of greater than 100 mm but not greater than 500 mm. However, the density is preferably from 1,570 to 1,610 kg/m$^3$, more preferably from 1,575 to 1,605 kg/m$^3$, even more preferably 1,577 to 1,603 kg/m$^3$, and particularly preferably from 1,580 to 1,600 kg/m$^3$. If the density of the solidification- and extrusion-molded article of polyglycolic acid is too low, cracking will readily occur during machining such as cutting, drilling, and shearing, due to decrease in strength, hardness, toughness, flexibility, and the like. If the density of the solidification- and extrusion-molded article of polyglycolic acid is too high, production will be difficult.

The thickness or diameter of the solidification- and extrusion-molded article of polyglycolic acid is greater than 100 mm but not greater than 500 mm, preferably from 102 to 400 mm, more preferably from 103 to 350 mm, even more preferably from 105 to 300 mm, and particularly preferably from 106 to 250 mm. In many cases, a solidification-and extrusion-molded article having satisfactory machinability can be obtained when the thickness or diameter is in a range of 107 to 200 mm, and most preferably the thickness or diameter is in a range of 108 to 150 mm.

If the thickness or diameter is too small, it will be difficult to mold a secondarily molded article having a desired shape via machining such as cutting. That is, because of flexibility and low toughness, it will be difficult or practically impossible to perform cutting or mechanical drilling using a drill or the like. Furthermore, if the thickness or diameter is too large, even when the solidification- and extrusion-molded article is heat-treated, it will be difficult to sufficiently remove or reduce residual stress. If a solidification- and extrusion-molded article having a large residual stress is subjected to machining, the obtained secondarily molded product will be readily deformed.

The solidification- and extrusion-molded article of polyglycolic acid of the present invention include solidification- and extrusion-molded articles having various shapes such as round bar, plate, pipe, or special shapes. However, from the perspective of easy solidification- and extrusion-molding and subsequently performed densification processing, and from the perspective of having many qualities suitable as a solidification- and extrusion-molded article, which is a stock shape for machining, the solidification- and extrusion-molded article preferably has a round bar or plate shape. Round bar shape is more preferable for forming a ball sealer for petroleum excavation described below.

The solidification- and extrusion-molded article of polyglycolic acid of the present invention may be a solidification- and extrusion-molded article such that the densities of a surface part and a center part of the molded article are different from each other. The difference between the density of the surface part and the density of the center part is preferably in a range of 0.5 to 50 kg/m$^3$, more preferably 1.5 to 20 kg/m$^3$, even more preferably 2.0 to 10 kg/m$^3$, and particularly preferably 2.5 to 5 kg/m$^3$. If the difference between the density of the surface part and the density of the center part of the solidification- and extrusion-molded article of polyglycolic acid is in the range described above, a stock shape for machining having excellent machinability can be obtained, and it will be possible to precisely control the shape of a secondarily molded product that is formed by cutting. Therefore, the above-described range is preferable.

2. Manufacturing Method for Solidification- and Extrusion-Molded Article of Polyglycolic Acid The solidification- and extrusion-molded article of polyglycolic acid of the present invention can be manufactured by the manufacturing method comprising the following steps 1 to 4.

a) step 1 of supplying a resin material containing polyglycolic acid, the polyglycolic acid having a melt viscosity of 200 to 2,000 Pa·s upon being measured at a temperature of 270° C. under a shearing speed of 120 sec$^{-1}$, into an extruder, and melt-kneading the resin material at a cylinder temperature of the extruder of 240 to 285° C.;

b) step 2 of extruding the resin material, melted by melt-kneading, from an extrusion die at a tip of the extruder into a flow path of a forming die comprising cooling means and the flow path that communicates with a path of melted resin of the extrusion die and that has a cross-sectional shape of an extrusion molded article;

c) step 3 of solidifying the melted and extruded matter formed from the resin material by cooling in the flow path of the forming die, and then extruding the solidified and extruded matter from the tip of the forming die to outside; and d) step 4 of pressurizing the solidified and extruded matter, and drawing the same while applying back pressure thereto in a direction of the forming die to suppress expansion of the solidified and extruded matter in a thickness direction or radial direction to obtain a solidification- and extrusion-molded article of polyglycolic acid having a thickness or diameter of greater than 100 mm but not greater than 500 mm.

Manufacturing steps for cases where a solidification- and extrusion-molded article of polyglycolic acid of the present invention has round bar or plate shape will be described. In the step 1, a resin material containing polyglycolic acid is placed in a hopper of an extruder. As the resin material, pellet is preferably used. The resin material is preferably sufficiently dried and dehumidified prior to molding. Conditions for dehumidification and drying is not particularly limited; however, for example, a method of leaving the pellet in a dry atmosphere at 100 to 160° C. for 1 to 24 hours is preferably employed.

In the step 1, the resin material is melt-kneaded in the cylinder of the extruder. The cylinder temperature is adjusted to 240 to 285° C., preferably 245 to 275° C., and more preferably 247 to 273° C. For cases where a plurality of heating means is arranged, corresponding to a solid phase resin transportation part, a melting part, a liquid phase resin transportation part, and the like, in the cylinder of the extruder, temperature of each heating means may be made different from each other within the range described above, or the temperature of each heating means may be controlled to be identical.

In the step 2, the resin material melted by melt-kneading is melt-extruded from an extrusion die at a tip of the extruder. The melted resin material from an extrusion die is extruded into a flow path of a forming die comprising cooling means and the flow path that communicates with a path of melted resin of the extrusion die and that has a cross-sectional shape of an extrusion molded article. The cross-sectional shape of the extrusion molded article is rectangular when the extrusion molded article has a plate shape; and the cross-sectional shape of the extrusion molded article is circular when the extrusion molded article has a round bar shape.

In the step 3, the melted and extruded matter formed from the resin material is solidified by cooling in the flow path of the forming die, and then solidified and extruded matter is extruded from the tip of the forming die to outside. The extrusion rate is typically from 5 to 27 mm/10 minutes, and preferably from 10 to 25 mm/10 minutes.

In the step 3, it is preferable to employ a method in which a forming die having heating means in addition to the cooling means is used; and the method comprises, first, heating the melted and extruded matter in the flow path around an extrusion die outlet to a temperature of 230 to 290° C., and preferably 250 to 285° C., by the heating means, and then cooling the melted and extruded matter, particularly the surface part thereof, in the flow path to a temperature lower than a crystallization temperature of the polyglycolic acid to solidify the melted and extruded matter by the cooling means. When the temperature around the extrusion die outlet is lowered rapidly, progress of crystallization of the polyglycolic acid may be delayed. By cooling the temperature in the vicinity of the extrusion die to a temperature within the range described above after heating, it is possible to promote crystallization of the melted and extruded matter, particularly the surface part thereof. Also, by setting the extrusion die outlet temperature to be within the range described above, the temperature of the melted and extruded matter, particularly the surface part thereof, that is in the flow path around the extrusion die outlet can be adjusted to a temperature within the range described above.

By cooling means, the extrusion molded article, particularly the temperature of the surface part thereof, is cooled to a temperature lower than the crystallization temperature of the polyglycolic acid to solidify. The crystallization temperature (crystallization temperature detected when the temperature of the polyglycolic acid in the melted state is lowered) of the polyglycolic acid is typically approximately from 130 to 140° C. The cooling temperature of the cooling means is preferably 100° C. or lower, and more preferably 90° C. or lower. The lower limit of the cooling temperature is preferably at 40° C., and more preferably at 50° C. For cases where the resin material used in the step 1 contains a filler such as glass fibers, the crystallization temperature of the polyglycolic acid may be raised due to melt-kneading in the cylinder of the extruder; however, even in this case, the cooling temperature is preferably within the range described above.

The heating means comprise, for example, a heater as a heat source. The cooling means comprise, for example, a cooling water pipe that can circulate cooling water as a coolant.

In the step 4, the solidified and extruded matter is pressurized and drawn while back pressure is applied in a direction of the forming die to suppress expansion of the solidified and extruded matter in a thickness direction or radial direction to obtain a solidification- and extrusion-molded article of polyglycolic acid having a thickness or diameter of greater than 100 mm but not greater than 500 mm. The pressurizing means include, for example, a combination of upper rolls and lower rolls. The solidified and extruded matter can be pressurized by a method of placing the lower rolls on a stand and then applying a load on the upper rolls. The solidified and extruded matter may be also pressurized by a method of applying a load on the lower rolls in a direction toward upper part and applying a load on the upper rolls in a direction toward lower part.

By applying the pressure, starting from the discharge port of the forming die, on the solidified and extruded matter extruded from the forming die by using rolls in which a plurality of rolls are combined, expansion of the solidified and extruded matter in the thickness direction or radial direction can be suppressed, and back pressure can be also applied in the forming die direction. Also, back pressure can be applied to the solidification- and extrusion-molded article in the forming die direction by combining suitable loading means. The amount of back pressure is typically in a range of 1,500 to 8,500 kg, preferably 1,600 to 8,000 kg, more preferably 1,800 to 7,000 kg, and even more preferably 2,000 to 6,000 kg. For cases where the diameter or thickness of the solidification- and extrusion-molded article is large, it is preferable to increase the back pressure to be applied. This back pressure can be measured as an external pressure of the die (pressure applied on the flow path).

By suppressing expansion of the solidified and extruded matter in a thickness direction or radial direction by this pressurization, the thickness or diameter of the finally resulting solidification- and extrusion-molded article is adjusted to greater than 100 mm but not greater than 500 mm. After the pressurization, the solidification- and extrusion-molded article is drawn.

For cases where the solidification- and extrusion-molded article is a round bar, other than the method of pressurizing using a combination of upper rolls and lower rolls described above, a method of arranging rolls to enclose the round bar-shaped solidification- and extrusion-molded article and then applying pressure on the rolls toward the center can be also used. Any method can be employed as the method of pressurizing the solidified and extruded matter discharged from the forming die as long as the method can apply back pressure in the forming die direction, can suppress expansion of the solidified and extruded matter in a thickness direction or radial direction by pressurization, and can adjust the thickness or diameter of the eventually resulting solidification- and extrusion-molded article to be greater than 100 mm but not greater than 500 mm.

The extrusion molded article of polyglycolic acid obtained in the step 4 is preferably annealed by performing step 5 in which the extrusion molded article is heat-treated at a temperature of 150 to 230° C. for 3 to 24 hours. By this annealing treatment, it is possible to remove residual stress of the solidification- and extrusion-molded article and to avoid inconveniences, such as deformation caused in the solidification- and extrusion-molded article itself and deformation caused in the secondarily molded article after machining. The heat treatment temperature is preferably from 175 to 225° C., and more preferably from 185 to 215° C. The heat treatment time is preferably from 4 to 20 hours, and more preferably from 5 to 15 hours.

Although solidification- and extrusion-molded articles of polyglycolic acid manufactured by the manufacturing method of the present invention can have various shapes such as round bar, plate, pipe, or special shapes, from the perspective of easy solidification- and extrusion-molding and subsequently performed densification processing, and from the perspective of having many qualities suitable as a stock shape for machining, the solidification- and extrusion-molded article preferably has a round bar or plate shape, and more preferably a round bar shape.

Examples of the machining that can be performed on the solidification- and extrusion-molded article of polyglycolic acid include cutting, drilling, shearing, and a combination of these. Broadly speaking, the cutting method may include drilling, in addition to cutting. Examples of the cutting method include turning, grinding, lathing, boring, and the like performed by using a single cutter. Examples of the cutting method making use of a multi-cutter include milling, drilling, thread cutting, gear cutting, diesinking, filing, and the like. In the present invention, drilling making use of a drill or the like may be distinguished from the cutting in some cases. Examples of the shearing method include shearing by a cutting tool (saw), shearing by abrasive grains, shearing by heating and melting, and the like. Besides these, ground finishing methods, plastic working methods such as punching making use of a knife-like tool and marking-off shearing, special working methods such as laser beam machining, and the like may also be applied.

For cases where the solidification- and extrusion-molded article of polyglycolic acid (i.e. stock shape for machining) has a plate or round bar shape having a large thickness, the solidification- and extrusion-molded article is typically shorn into a proper size or thickness, the shorn solidification- and extrusion-molded article is ground to adjust its shape to a desired shape, and, as necessary, some parts of the solidification- and extrusion-molded article are further subjected to drilling. The solidification- and extrusion-molded article is finally subjected to a finishing operation as necessary. However, the order of the machining is not limited to this order. When a smooth surface is hard to form because of melting of the solidification- and extrusion-molded article due to frictional heat upon the machining, the machining is desirably performed while cooling a cut surface or the like. Excessive heat generated on the solidification- and extrusion-molded article by frictional heat can cause deformation and discoloration. Therefore, it is preferable to control the temperature of the solidification- and extrusion-molded article or surface to be machined to a temperature of 200° C. or lower, and more preferably to a temperature of 150° C. or lower.

3. Stock Shape for Machining

By subjecting the solidification- and extrusion-molded article of polyglycolic acid of the present invention to machining such as cutting, drilling, and shearing, the solidification- and extrusion-molded article can be made into a stock shape for machining, whereby various secondarily molded articles such as resin parts can be obtained. Examples of the secondarily molded article include various components used in a downhole (downhole tools) that are used in drilling and completion of hydrocarbon resources (as previously stated, also simply referred to as "petroleum") such as petroleum and gas. That is, the secondarily molded article is exemplified by a downhole tool or component thereof formed from a degradable material, such as plug for petroleum excavation or mandrel of the plug. In particular, the secondarily molded article is exemplified by a ball sealer for petroleum excavation formed from a degradable material. By cutting the solidification- and extrusion-molded article of polyglycolic acid of the present invention, a downhole tool or component thereof, particularly a ball sealer, having a large diameter such as a diameter of 20 mm or greater, preferably a diameter of 50 mm or greater, more preferably a diameter of 70 mm or greater, and particularly preferably a diameter of 90 mm or greater, can be obtained. The upper limit of the diameter of the ball sealer and the like is typically 300 mm and, in many cases, 200 mm.

That is, by comprising the step 6 in which the solidification- and extrusion-molded article of polyglycolic acid manufactured by the manufacturing method of the present invention is subjected to cutting, a ball sealer for petroleum excavation, that is a downhole tool or component thereof, having a diameter of 20 to 200 mm and the like can be manufactured. The diameter of the ball sealer for petroleum excavation or the like is more preferably in a range of 30 to 170 mm, even more preferably 50 to 150 mm, and particularly preferably 70 to 120 mm.

The solidification- and extrusion-molded article of polyglycolic acid of the present invention can be formed into other secondarily molded articles by subjecting the solidification- and extrusion-molded article to machining. In electric and electronic fields, examples thereof include wafer carriers, wafer cassettes, spin chucks, tote bottles, wafer boards, IC chip trays, IC chip carriers, IC conveying tubes, IC test sockets, burn-in sockets, pin grid array sockets, quad flat packages, leadless chip carriers, dual in-line packages, small outline packages, reel packings, various cases, storage trays, parts for conveying apparatus, magnetic card readers, and the like.

In a field of OA instruments, examples thereof include various roll components in image forming apparatus such as electrophotographic copying machines and electrostatic recording apparatus, transfer drums for recording apparatus, printed circuit board cassettes, bushings, paper and paper money conveying parts, paper feed rails, font cartridges, ink ribbon canisters, guide pins, trays, rollers, gears, sprockets, housings for computers, modem housings, monitor housings, CD-ROM housings, printer housings, connectors, computer slots, and the like.

In a field of communication apparatus, examples thereof include portable telephone parts, pagers, various kinds of sliding materials, and the like. In a field of automobiles, examples thereof include interior materials, underhoods, electronic and electric instrument housings, gas tank caps, fuel filters, fuel line connectors, fuel line clips, fuel tanks, instrument bezels, door handles, other various parts, and the like. In other fields, examples thereof include electric wire supporters, electromagnetic wave absorbers, flooring materials, pallet, shoe soles, brushes, blower fans, flat heaters, polyswitches, and the like.

EXAMPLES

The present invention will be described in further detail hereinafter using working examples, a comparative example, and reference examples; however, the present invention is not limited by the examples. The measurement methods for the physical properties and characteristics are as follows.

(1) Melt Viscosity of Polyglycolic Acid

Using a sample, prepared by crystallizing an amorphous sheet of polyglycolic acid having a thickness of approximately 0.2 mm by heating the amorphous sheet at approximately 150° C. for 5 minutes, melt viscosity of the sample was measured by using a capilograph equipped with a nozzle having a diameter (D) of 0.5 mm and length (L) of 5 mm (manufactured by Toyo Seiki Seisaku-sho, Ltd.) at a temperature of 270° C. under a shearing speed of 120 sec$^{-1}$.

(2) Density

A sample cut out from the solidification- and extrusion-molded article of polyglycolic acid was measured in accordance with JIS R 7222 (a pycnometer method using n-butanol).

Working Example 1

Pellets of polyglycolic acid having a melt viscosity of 920 Pa·s, measured at a temperature of 270° C. under a shearing speed of 120 sec$^{-1}$, were left at a temperature of 140° C. for 6 hours to dehumidify and dry. The dehumidified and dried pellets were supplied to the hopper of a single screw extruder (L/D=20; diameter: 30 mm), melt-kneaded at a cylinder temperature of 251° C., melt-extruded into a flow path of a forming die at an extrusion die outlet temperature of 276° C., and cooled and solidified at a cooling temperature of 80° C. Extrusion rate was approximately 18 mm/10 minutes.

By pressurizing the solidification- and extrusion-molded article that was solidified in the flow path of the forming die by passing the solidification- and extrusion-molded article in between upper rolls and lower rolls, expansion of the solidification- and extrusion-molded article of polyglycolic acid were suppressed by adjusting the external pressure (back pressure) of the forming die to be 3,200 kg. Thereafter, the solidification- and extrusion-molded article was heat-treated at a temperature of 205° C. for 10 hours to remove residual stress. The heat treatment did not crack or deform the solidification- and extrusion-molded article.

By the method as described above, a round bar-shaped solidification- and extrusion-molded article of polyglycolic acid having a diameter of 120 mm and a length of 1,000 mm was obtained. Using samples (three samples) that were cut out in the radial direction from positions located at 5 mm from each of the ends of the obtained round bar and from a position at the center of the obtained round bar in the length direction, densities of the outer surface part and the center part in the radial direction (radius: 10 mm) were measured. The density of the outer surface part was 1,581.1 kg/m$^3$, and the density of the center part was 1,584.2 kg/m$^3$ (average values of three samples).

When the obtained round bar was shorn using a milling cutter, the round bar was shorn without causing cracks. Shorn surface thereof had no streak-like flow pattern caused by insufficient kneading, and the shorn surface was uniform and beautiful. Furthermore, when this round bar was subjected to cutting at 495 rotation/minutes using a single-edged HSS tool bit, nine balls having a diameter of 101.6 mm (4 inches) were produced without causing cracks.

Working Example 2

A round bar-shaped solidification- and extrusion-molded article of polyglycolic acid having a diameter of 120 mm and a length of 1,000 mm was obtained in the same manner as in Working Example 1 except for using a raw material that is obtained by preparing pellets of a resin material via melt-kneading glass fibers (03JAFT592S, manufactured by Owens Corning; length: 3 mm) and a polyglycolic acid having a melt viscosity, measured at a temperature of 270° C. under a shearing speed of 120 sec$^{-1}$, of 920 Pa·s mixed at a mass ratio of 70:30, and then leaving the pellets at a temperature of 120° C. for 6 hours to dehumidify and dry the pellets.

When the obtained round bar was shorn using a milling cutter, the round bar was shorn without causing cracks. Shorn surface thereof had no streak-like flow pattern caused by insufficient kneading, and the shorn surface was uniform and beautiful. Furthermore, when this round bar was subjected to cutting in the same manner as in Working Example 1, nine balls having a diameter of 101.6 mm (4 inches) were produced without causing cracks.

Comparative Example 1

A round bar-shaped solidification- and extrusion-molded article of polyglycolic acid having a diameter of 120 mm and a length of 1,000 mm was produced in the same manner as in Working Example 1 except for using, as a raw material, pellets of polyglycolic acid having a melt viscosity, measured at a temperature of 270° C. under a shearing speed of 120 sec$^{-1}$, of 100 Pa·s. However, in a step of heat-treating at a temperature of 205° C. for 10 hours, deformation such as necking was observed in some parts of the article.

When the produced round bar was subjected to cutting in the same manner as in Working Example 1, cracks occurred. Furthermore, when this round bar was subjected to shearing in the same manner as in Working Example 1, a streak-like flow pattern was observed on the shorn surface.

Reference Example 1

A round bar-shaped solidification- and extrusion-molded article of polyglycolic acid having a diameter of 30 mm and a length of 1,000 mm was obtained by performing the same procedure as in Working Example 1. The heat treatment did not crack or deform the solidification- and extrusion-molded article.

When the obtained round bar was shorn using a milling cutter, the round bar was shorn without causing cracks. Shorn surface thereof had no streak-like flow pattern caused by insufficient kneading, and the shorn surface was uniform and beautiful. Furthermore, when this round bar was subjected to cutting in the same manner as in Working Example 1, 35 balls having a diameter of 25.4 mm (1 inch) were produced without causing cracks.

Reference Example 2

After a round bar-shaped solidification- and extrusion-molded article of polyglycolic acid having a diameter of 30 mm and a length of 1,000 mm was obtained by performing the same procedure as in Comparative Example 1, the obtained round bar was shorn using a milling cutter. The round bar was shorn without causing cracks. The heat treatment did not crack or deform the solidification- and extrusion-molded article. Shorn surface thereof had no streak-like flow pattern caused by insufficient kneading, and the shorn surface was uniform and beautiful. Furthermore, when this round bar was subjected to cutting in the same manner as in Working Example 1, 35 balls having a diameter of 25.4 mm (1 inch) were produced without causing cracks.

From Working Examples 1 and 2, it was found that a solidification- and extrusion-molded article of polyglycolic acid that was formed of a resin material containing polyglycolic acid, the polyglycolic acid having a melt viscosity of 200 to 2,000 Pa·s when measured at a temperature of 270° C. under a shearing speed of 120 sec$^{-1}$, and that had a thickness or diameter of greater than 100 mm but not greater than 500 mm had excellent machinability and was possible to be formed into a secondarily molded product, particularly a ball sealer for petroleum excavation, via machining, such as cutting, drilling, and shearing. On the other hand, it was found that the solidification- and extrusion-molded article of polyglycolic acid of Comparative Example 1 that was formed of a resin material containing polyglycolic acid, the polyglycolic acid having a melt viscosity of 100 Pa·s when measured at a temperature of 270° C. under a shearing speed of 120 sec$^{-1}$, and that had a thickness or diameter of greater than 100 mm but not greater than 500 mm was deformed by the heat treatment that was performed in order to reduce stress, was cracked by machining such as cutting or shearing, and/or failed to provide a beautifully processed surface.

Furthermore, from Reference Examples 1 and 2, for the solidification- and extrusion-molded articles of polyglycolic acid having a thickness or diameter of 100 mm or less, no significant differences in machinability and heat resistance were observed due to difference in materials, i.e. a resin material containing polyglycolic acid having a melt viscosity of 200 to 2,000 Pa·s and a resin material containing polyglycolic acid having the melt viscosity of 100 Pa·s when measured at a temperature of 270° C. under a shearing speed of 120 sec$^{-1}$. That is, it was found that, in order to achieve excellent machinability and heat resistance that make it possible to produce a ball sealer for petroleum excavation having a diameter of 20 to 200 mm, for the solidification- and extrusion-molded article of polyglycolic acid having a thickness or diameter of greater than 100 mm but not greater than 500 mm, a resin material containing polyglycolic acid having a melt viscosity, measured at a temperature of 270° C. under a shearing speed of 120 sec$^{-1}$, of 200 to 2,000 Pa·s should be selected, and a particular solidification- and extrusion-molding step should be employed.

INDUSTRIAL APPLICABILITY

Since the solidification- and extrusion-molded article of polyglycolic acid of the present invention is a solidification-and extrusion-molded article of polyglycolic acid formed of a resin material containing polyglycolic acid, the polyglycolic acid having a melt viscosity of 200 to 2,000 Pa·s when measured at a temperature of 270° C. under a shearing speed of 120 sec$^{-1}$, and has a thickness or diameter of greater than 100 mm but not greater than 500 mm, the solidification- and extrusion-molded article exhibits high precision in processing, is suitable for molding a secondarily molded article, such as various resin parts, via machining, and is also suitable for molding a downhole tool or component thereof, particularly a ball sealer for petroleum excavation having a diameter of 20 to 200 mm or the like. Therefore, the solidification- and extrusion-molded article of polyglycolic acid of the present invention has high industrial applicability.

The invention claimed is:

1. A solidification- and extrusion-molded article of polyglycolic acid; the solidification- and extrusion-molded article being formed of a resin material containing polyglycolic acid, the polyglycolic acid having a melt viscosity of 200 to 2,000 Pa·s upon being measured at a temperature of 270° C. under a shearing speed of 120 sec-1; and having a thickness or diameter of greater than 100 mm but not greater than 500 mm, wherein the difference between the density of the surface part and the density of the center part is in a range of 2.5 kg/m$^3$ to 5 kg/m$^3$.

2. The solidification- and extrusion-molded article of polyglycolic acid according to claim 1, wherein the solidification- and extrusion-molded article has a round bar or plate shape.

3. The solidification- and extrusion-molded article of polyglycolic acid according to claim 1, wherein the resin material is a polyglycolic acid composition containing from 0.001 to 5 mass % of colorant in terms of a total mass.

4. The solidification- and extrusion-molded article of polyglycolic acid according to claim 1, wherein the resin material is a polyglycolic acid composition containing from 5 to 70 mass % of filler in terms of the total mass.

5. The solidification- and extrusion-molded article of polyglycolic acid according to claim 1, wherein the solidification- and extrusion-molded article is a stock shape for machining.

6. A downhole tool or component thereof formed by cutting the solidification- and extrusion-molded article of polyglycolic acid described in claim 5.

7. A plug for petroleum excavation formed by cutting the solidification- and extrusion-molded article of polyglycolic acid described in claim 5.

8. A mandrel of plug for petroleum excavation formed by cutting the solidification- and extrusion-molded article of polyglycolic acid described in claim 5.

9. A ball sealer for petroleum excavation having a diameter of 20 to 200 mm formed by cutting the solidification- and extrusion-molded article of polyglycolic acid described in claim 5.

* * * * *